United States Patent
Shin et al.

(10) Patent No.: US 10,452,760 B2
(45) Date of Patent: *Oct. 22, 2019

(54) RULE BASED METHOD AND APPARATUS FOR CONTROLLING PAGE SWITCHING CAPACITY ON MOBILE DEVICES

(71) Applicant: SK PLANET CO., LTD., Seongnam-si, Gyeonggi-do (KR)

(72) Inventors: Ho Chul Shin, Suwon-si (KR); Eun Bok Lee, Seoul (KR)

(73) Assignee: SK PLANET CO., LTD., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/644,035

(22) Filed: Jul. 7, 2017

(65) Prior Publication Data

US 2017/0308514 A1    Oct. 26, 2017

Related U.S. Application Data (63) Continuation of application No. 14/344,387, filed as application No. PCT/KR2013/006354 on Jul. 16, 2013, now Pat. No. 9,767,084.

(30) Foreign Application Priority Data

Sep. 14, 2012 (KR) .................. 10-2012-0102030
Sep. 26, 2012 (KR) .................. 10-2012-0107026

(51) Int. Cl.
*G06F 17/20* (2006.01)
*G06F 17/22* (2006.01)
(Continued)

(52) U.S. Cl.
CPC ............ *G06F 17/2247* (2013.01); *G06F 3/14* (2013.01); *G06Q 30/0277* (2013.01); *G09G 5/346* (2013.01); *G09G 2340/02* (2013.01)

(58) Field of Classification Search
CPC ....... G06F 3/14; G06F 17/2247; G06Q 30/00; G06Q 30/0277; G09G 5/346; G09G 2340/02
(Continued)

(56) References Cited

U.S. PATENT DOCUMENTS 8,583,188 B2    11/2013  Sundaresan et al.
9,524,513 B2 *  12/2016  Grundfast .......... G06Q 30/0267
(Continued)

FOREIGN PATENT DOCUMENTS

CN      102037435 A      4/2011
EP       1694037 A1      8/2006
(Continued)

OTHER PUBLICATIONS

International Search Report dated Oct. 10, 2013 for PCT/KR2013/006354.
(Continued)

*Primary Examiner* — Mohammed H Zuberi
(74) *Attorney, Agent, or Firm* — Brinks Gilson & Lione (57) ABSTRACT

The present invention relates to a method and apparatus for controlling a page switching capacity and includes a terminal, including an input unit for receiving a user command, an output unit for displaying a page for service, a terminal information confirmation unit for confirming terminal information when a page switching event is detected in the page displayed on the output unit, and a page switching execution processing unit for determining a page switching effect based on the confirmed terminal information and performing page switching with the determined page switching effect.

13 Claims, 6 Drawing Sheets

(51) Int. Cl.
*G06F 3/14* (2006.01)
*G06Q 30/02* (2012.01)
*G09G 5/34* (2006.01)

(58) Field of Classification Search
USPC ........................................................ 715/234
See application file for complete search history.

(56) References Cited

U.S. PATENT DOCUMENTS

| | | |
|---|---|---|
| 2002/0077900 A1 | 6/2002 | Thompson et al. |
| 2007/0067267 A1 | 3/2007 | Ives |
| 2008/0052614 A1* | 2/2008 | Urabe .................. G06F 3/0481 715/234 |
| 2009/0070129 A1 | 3/2009 | Inbar et al. |
| 2009/0293007 A1 | 11/2009 | Duarte et al. |
| 2010/0036740 A1* | 2/2010 | Barashi .................. G06Q 30/02 705/14.71 |
| 2010/0070626 A1 | 3/2010 | McColgan et al. |
| 2010/0241507 A1 | 9/2010 | Quinn et al. |
| 2011/0167364 A1 | 7/2011 | Pentikainen et al. |
| 2011/0238496 A1 | 9/2011 | Gurbuxani et al. |
| 2011/0258049 A1 | 10/2011 | Ramer et al. |
| 2012/0158519 A1 | 6/2012 | Edwards |
| 2013/0145252 A1* | 6/2013 | Lie ...................... G06F 17/2247 715/234 |
| 2013/0232005 A1 | 9/2013 | Torii |

FOREIGN PATENT DOCUMENTS

| | | |
|---|---|---|
| KR | 1020050074249 A | 7/2005 |
| KR | 100752926 B1 | 8/2007 |

OTHER PUBLICATIONS

Jon Reid, "jQuery Mobile", published by O'Reily, Jun. 2011.
JQuery Project code, copyright 2011, at http://java.net/projects/midas/sources/midas-js-svn/content/mweb-workspace/query.mobil-1.0/jquery.mobil.structure-1.0.css?rev=3.

* cited by examiner

```
@-webkit-keyframes popin {
  from {
    -webkit-transform: scale(.8);
    opacity: 0;
  }
  to {
    -webkit-transform: scale(1);
    opacity: 1;
  }
}
```

```
@-webkit-keyframes popin2 {
  from {
    -webkit-transform: scale(.5);
  }
  to {
    -webkit-transform: scale(1);
  }
}
```

(a) pop                    (b) pop2

FIG.4

```
@-webkit-keyframes flipouttoleft {
  from { -webkit-transform: rotateY(0); }
  to { -webkit-transform: rotateY(-90deg) scale(.9); }
}
```

```
@-webkit-keyframes flipout2 {
  from { -webkit-transform: scaleX(100%); }
  to { -webkit-transform: scaleX(0); }
}
```

(a) flip                   (b) flip2

FIG.5

```
@-webkit-keyframes flipouttoleft {
    from { -webkit-transform: rotateY(0); }
    to { -webkit-transform: rotateY(-90deg) scale(.9); }
}
```

(a) turn

```
@-webkit-keyframes flipout2 {
    from { -webkit-transform: scaleX(100%); }
    to { -webkit-transform: scaleX(0); }
}
```

(b) turn2

RULE BASED METHOD AND APPARATUS FOR CONTROLLING PAGE SWITCHING CAPACITY ON MOBILE DEVICES

CROSS REFERENCE TO RELATED APPLICATION

The present application is a continuation of the U.S. patent application Ser. No. 14/344,387, filed on Mar. 12, 2014, which is a U.S. National Phase Entry of International Patent Application No. PCT/KR2013/006354 filed Jul. 16, 2013, which is based upon and claims the benefit of priority to Korean Patent Application No. 10-2012-0102030, filed on Sep. 14, 2012 and Korean Patent Application No. 10-2012-0107026, filed on Sep. 26, 2012. The disclosures of the above-listed applications are hereby incorporated by reference herein in their entirety.

TECHNICAL FIELD

The present invention relates to a method and apparatus for controlling a page switching capacity and, more particularly, to a method and apparatus for controlling a page switching capacity, wherein when a page switching event is detected in a currently displayed page, terminal information is configured, a page switching effect is determined based on the confirmed terminal information, page switching is performed according to the determined page switching effect, and advertisement information is displayed while implementing a process of a corresponding page moving to a previous or next sequence target page is implemented according to a predetermined page switching effect.

BACKGROUND ART

Recently, with the great development of mobile communication technology, the demand for mobile communication terminals is suddenly increasing. In such a situation, mobile communication technology is not limited to simple voice service, but is developing into various types of data communication services, such as the transmission of Short Message Service (SMS), an Internet search, and data downloading.

In particular, related applications according to the wide spread of mart phones are explosively increased, and screen switching in an application driven in a smart phone is chiefly performed by moving (dragging or pulling) a user's finger on a screen of the smart phone.

However, there is a problem in that a page switching operation is not performed in a terminal that does not support a page switching effect set in service because terminal capacities are never considered in a conventional page switching effect.

Furthermore, a method in which a sponsor directly sends a text message or a voice message (ARS) to a user's mobile communication terminal and the user checks the text message or the voice message, a method in which a user views a banner advertisement in a web site and a mobile communication fee discount is given to the user in return for the viewing of the banner advertisement, were used as a conventional advertisement method using a mobile communication terminal.

The aforementioned conventional advertisement method using mobile communication, however, was problematic in that a user had to visit a web site every time in order to view an advertisement and had to check text or a voice message every time when the advertisement is transmitted through the text or voice message.

DISCLOSURE

Technical Problem

The present invention has been made to solve the above problems, and an object of the present invention is to provide a method and apparatus for controlling a page switching capacity, wherein when a page switching event is generated, a page switching effect is determined based on terminal information including the type or capacities of a terminal and page switching is performed with the determined page switching effect.

Another object of the present invention is to provide a method and apparatus for controlling a page switching capacity, which are capable of providing the most similar page switching effect in relation to page switching effects not supported by a terminal when a page switching event is generated.

Yet another object of the present invention is to provide a method and apparatus for controlling a page switching capacity, which are capable of implementing a page switching effect using a transform function supported by a terminal even when a page switching effect set in service and a page switching effect according to a fallback rule are not provided and performing page switching with the implemented page switching effect.

Further yet another object of the present invention is to provide a method and apparatus for controlling a page switching capacity, which are capable of displaying advertisement information while implementing a process of being moved to a previous or next sequence target page when a page switches with a predetermined page switching effect.

Technical Solution

In accordance with an aspect of the present invention for achieving the objects, there is provided a terminal, including an input unit for receiving a user command, an output unit for displaying a page for service, a terminal information confirmation unit for confirming terminal information when a page switching event is detected in the page displayed on the output unit, and a page switching execution processing unit for determining a page switching effect based on the confirmed terminal information and performing page switching with the determined page switching effect.

The terminal may further include a page switching event processing unit for sending an advertisement information request signal to a service providing apparatus when the page switching event is generated in the page being displayed on the output unit, displaying received advertisement information while implementing a process of a movement from the corresponding page to a previous or next sequence target page with a predetermined page switching effect when the advertisement information is received from the service providing apparatus, and displaying the target page when an advertisement display stop event is detected.

The terminal information may include the capacities of a terminal including a supportable transform function and the type of terminal.

The page switching execution processing unit may determine whether or not a page switching effect set in the service is possible based on the terminal information, perform page switching with the page switching effect set in the service if the page switching effect set in the service is possible, and perform page switching with a page switching effect according to a predetermined fallback rule if the page switching effect set in the service is not possible.

Furthermore, if the page switching effect according to the fallback rule is not possible based on the terminal information, the page switching execution processing unit may implement a substitution page switching effect using a transform function supportable by the terminal and perform page switching with the implemented substitution page switching effect.

The page switching effect may be at least one of a page switching effect (flip) in which the corresponding page is turned over based on the center of an x axis, a page switching effect (pop) in which a new window pops up, a page switching effect (slide) in which the corresponding page is generally scrolled, a new page is also scrolled, and thus a previous page slides out, a page switching effect (fade) in which a previous page fades out and a new page fades in, a page switching effect (turn) in which the leaves of a book are turned over, a page switching effect (flow) in which a scale of a previous page is reduced to a specific scale, the reduced page slides out, a new page slides in on a screen in the state in which the new page has been reduced to a specific scale, and the new page returns to a normal scale again, slidedown, and slideup.

When the page switching event is generated in the page being displayed, the page switching event processing unit may display the advertisement information on a rear region of the corresponding page which is generated and seen when the corresponding page is turned over while implementing a page switching effect (flip) in which the corresponding page is turned over based on the center of an x axis, display the advertisement information on a new window while implementing a page switching effect (pop) in which the new window pops up in a region of the corresponding page, display the advertisement information in a middle of a new page while implementing a page switching effect (slide) in which the corresponding page is generally scrolled, the new page is also scrolled, and a previous page slides out, fade in a page on which advertisement information is displayed instead of a new page while implementing a page switching effect (fade) in which the previous page fades out and the new page fades in, display the advertisement information on a rear region of the corresponding page that is generated and seen when the corresponding page is turned over to a target page while implementing a page switching effect (turn) in which the leaves of a book are turned over, or display a page into which advertisement information has been inserted instead of a new page while implementing a page switching effect (flow) in which a scale of a previous page is reduced by a specific scale, the previous page slides out, the new pages slides in on a screen in the state in which the new page has been reduced to a specific scale, and the screen returns back to a normal scale, and display a target page when an advertisement display stop event is recognized.

In accordance with another aspect of the present invention, there is provided a service providing apparatus, including a service providing DB for storing service-related information including at least one of a page switching effect and a fallback rule for each service, a service registration unit for storing information about service in the service providing DB when a service registration request signal including at least one of the service, a page switching effect set in the service, and a fallback rule for the page switching effect is received from a terminal, and a service providing unit for obtaining a web or WAP page for the service from the service providing DB when the providing of the service is requested by the terminal and providing the obtained web or WAP page to the terminal.

The service providing apparatus may further include an advertisement information DB for storing advertisement information and an advertisement providing unit for obtaining advertisement information from the advertisement information DB when an advertisement information request signal is received from the terminal, transforming the obtained advertisement information according to the standards of the terminal or the scale of a page, and providing the transformed advertisement information to the terminal.

A page switching effect and a fallback rule for the page switching effect may be set in each service stored in the service providing DB, each page switching effect may include a transform function, and information about a supportable terminal may be set in each transform function.

The advertisement providing unit may obtain the advertisement information through at least one of methods using advertisement information corresponding to corresponding page identification information, advertisement information according to a predetermined advertisement scheduling algorithm, and advertisement information based on preference advertisement information corresponding to user identification information.

In accordance with yet another aspect of the present invention, there is provided a system for controlling a page switching capacity, including a service providing apparatus for providing a terminal with information related to a page switching effect set in corresponding service along with the service when the providing of the service is requested by the terminal and a terminal for confirming terminal information when a page switching event is detected in a page being displayed, determining a page switching effect based on the confirmed terminal information, and performing page switching with the determined page switching effect.

The terminal may determine whether the page switching effect set in the service is possible or not based on the terminal information, perform page switching with the page switching effect set in the service if the page switching effect set in the service is possible, and perform page switching with a page switching effect according to a predetermined fallback rule if the page switching effect set in the service is not possible.

The terminal may send an advertisement information request signal to the service providing apparatus when the page switching event is detected, display received advertisement information while implementing a process of a movement from the corresponding page to a previous or next sequence page with a predetermined page switching effect when the advertisement information is received from the service providing apparatus, and display a target page when an advertisement display stop event is detected. The service providing apparatus may obtain the advertisement information set in the corresponding page when the advertisement information request signal is received from the terminal and provide the obtained advertisement information to the terminal.

In accordance with further yet another aspect of the present invention, there is provided a method of controlling, by a user terminal, a page switching capacity, including steps of (a) confirming terminal information when a page switching event is detected in a currently displayed page and (b) determining a page switching effect based on the confirmed terminal information and performing page switching with the determined page switching effect.

The step (b) may include steps of determining whether or not a page switching effect set in service is possible based on the confirmed terminal information and performing page switching with the page switching effect set in the service if, as a result of the determination, the page switching effect set in the service is possible and performing page switching with a page switching effect according to a predetermined fallback rule if, as a result of the determination, the page switching effect set in the service is not possible.

The step of performing page switching with the page switching effect according to the predetermined fallback rule may include steps of determining whether or not the page switching effect according to the fallback rule is possible based on the confirmed terminal information and performing page switching with the page switching effect according to the fallback rule if, as a result of the determination, the page switching effect according to the fallback rule is possible, implementing a substitution page switching effect using a transform function supportable by the terminal if, as a result of the determination, the page switching effect according to the fallback rule is not possible, and performing page switching with the implemented substitution page switching effect.

In accordance with further yet another aspect of the present invention, there is provided a method of controlling, by a terminal, a page switching capacity, including steps of sending an advertisement information request signal to a service providing apparatus when a page switching event is generated in a web or WAP page including at least one page, displaying received advertisement information while implementing a process of a movement from the corresponding page to a previous or next sequence page with a predetermined page switching effect when the advertisement information is received from the service providing apparatus, and displaying a target page when an advertisement display stop event is detected.

In accordance with further yet another aspect of the present invention, there is provided an electronic device-readable recording medium on which a method for controlling a page switching capacity is recorded in a program form, the method including steps of (a) confirming terminal information when a page switching event is detected in a currently displayed page and (b) determining a page switching effect based on the confirmed terminal information and performing page switching with the determined page switching effect.

Advantageous Effects

In accordance with the present invention, when a page switching event is generated, a page switching effect is determined based on terminal information including the type or capacities of a terminal, and page switching can be performed with the determined page switching effect. Accordingly, the most similar page switching effect can be provided in relation to page switching effects not supported by a terminal.

Furthermore, in a situation in which a page switching effect for service is fragmented because fragmentation is performed on several terminals present in the word, users and developers can use and provide the most similar page switching effect.

Furthermore, even when a page switching effect set in service and a page switching effect according to a fallback rule are not provided, a page switching effect is implemented using a transform function supported by a terminal and page switching is performed. Accordingly, a problem in that no effect processing is performed or malfunction, such as a broken screen, is generated can be solved.

Furthermore, an advertisement effect can be maximized because an advertisement is displayed when a page switches.

Furthermore, various advertisements can be naturally displayed to a user because advertisement information is displayed while implementing a process of moving to a previous or next sequence target page with a predetermined page switching effect when a page switches.

DESCRIPTION OF REFERENCE NUMERALS

100: terminal
110: communication unit
120: input unit
130: output unit
140: memory unit
150: terminal information confirmation unit
160: page switching execution processing unit
170: page switching event processing unit
200: service providing apparatus
210: service providing DB
220: service registration unit
230: service providing unit
240: advertisement information DB
250: advertisement providing unit

MODE FOR INVENTION

The details of the aforementioned objects, technical construction, and operational effects of the present invention will be more clearly understood from the following detailed description based on the accompanying drawings attached to the specification of the present invention.

Figure 1:
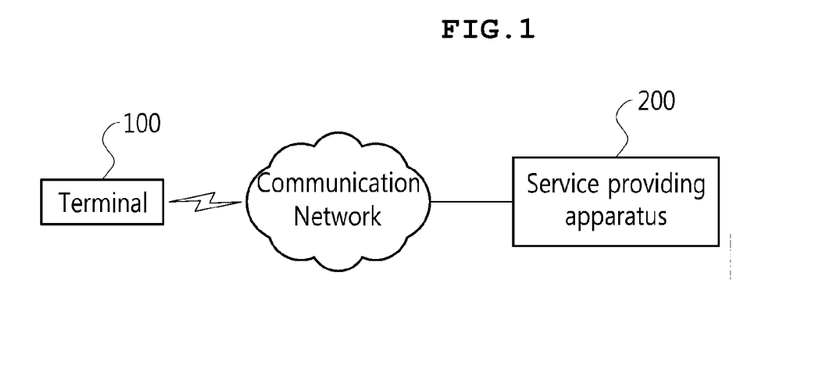
FIG. 1 is a diagram showing a system for controlling a page switching capacity in accordance with an embodiment of the present invention.

FIG. 1 is a diagram showing a system for controlling a page switching capacity in accordance with an embodiment of the present invention.

Referring to FIG. 1, the system for controlling a page switching capacity includes a service providing apparatus 200 for providing service requested by a terminal 100 and the terminal 100 for displaying a page for the service received from the service providing apparatus 200.

The terminal 100 confirms terminal information when a page switching event is generated in a page (or document) being displayed, determines a page switching effect based on the confirmed terminal information, and performs page switching with the determined page switching effect. That is, the terminal 100 determines whether or not to use a page switching effect set in current service or to change a current page switching effect into another similar page switching effect or a different page switching effect based on the terminal information and performs page switching with the determined page switching effect. Here, the terminal information may include the type of terminal, the capacities of the terminal, etc., and the capacities of the terminal may include a transform function supportable by the terminal, etc. The page switching effect may include a page switching effect (flip) in which a corresponding page is turned over on the basis of the center of an x axis, a page switching effect (pop) in which a new window pops up, a page switching effect (slide) in which a corresponding page is generally scrolled, a new page is also scrolled, and thus a previous page slides out, a page switching effect (fade) in which a previous page fades out and a new page fades in, a page switching effect (turn) in which the leaves of a book are turned over, a page switching effect (flow) in which the scale of a previous page is reduced to a specific scale, the reduced page slides out, a new page slides in on a screen in the state in which the new page has been reduced to a specific scale, and the new page returns to a normal scale again, slidedown, slideup, and so on.

Furthermore, when a page switching event is generated in a web or WAP page being displayed, the user terminal 100 sends an advertisement information request signal to the service providing apparatus 200. Here, the advertisement information request signal includes user identification information, page identification information, terminal identification information, and so on.

Furthermore, when advertisement information is received from the service providing apparatus 200, the user terminal 100 displays the received advertisement information while implementing a process of a movement from a page being displayed to a previous or next sequence page with a predetermined page switching effect.

Furthermore, when an advertisement display stop event is recognized while displaying advertisement information on a page, the user terminal 100 terminates the display of the advertisement information and displays a target page.

Any user device on which a communication function and a short-range communication function are mounted can be applied as such a terminal 100. For example, various types of devices, such as a notebook, a wireless communication terminal, a smart phone, a Portable Media Player (PMP), a Portable Digital Assistant (PDA), a tablet PC, a set-top box, or smart TV can become the terminal 100.

The terminal 100 is described in detail with reference to FIG. 2.

The service providing apparatus 200 provides a page (or document) for service requested by the terminal 100. That is, when the providing of service is requested by the terminal 100, the service providing apparatus 200 provides the terminal 100 with information related to a page switching effect, set in corresponding service, along with the corresponding service.

Furthermore, when a service registration request signal including at least one of service, a page switching effect set in the service, and a fallback rule for the page switching effect is received from the terminal 100, the service providing apparatus 200 stores information about the service in a service providing DB.

Furthermore, the service providing apparatus 200 provides a web or WAP page requested by the user terminal 100. When an advertisement information request signal is received from the user terminal 100, the service providing apparatus 200 obtains advertisement information set in a corresponding page and provides the obtained advertisement information to the user terminal 100. That is, when an advertisement information request signal including user identification information, page identification information, terminal identification information, etc. is received, the service providing apparatus 200 obtains advertisement information corresponding to a corresponding page and advertisement information according to a predetermined advertisement scheduling algorithm and provides the pieces of advertisement information to the user terminal 100. Here, the service providing apparatus 200 can convert the advertisement information according to the standards of the user terminal 100 or the size of a page and provide the changed advertisement information. Here, the standards of the user terminal 100 may include resolution, a size, and so on.

The service providing apparatus 200 is described in detail with reference to FIG. 3.

Figure 2:
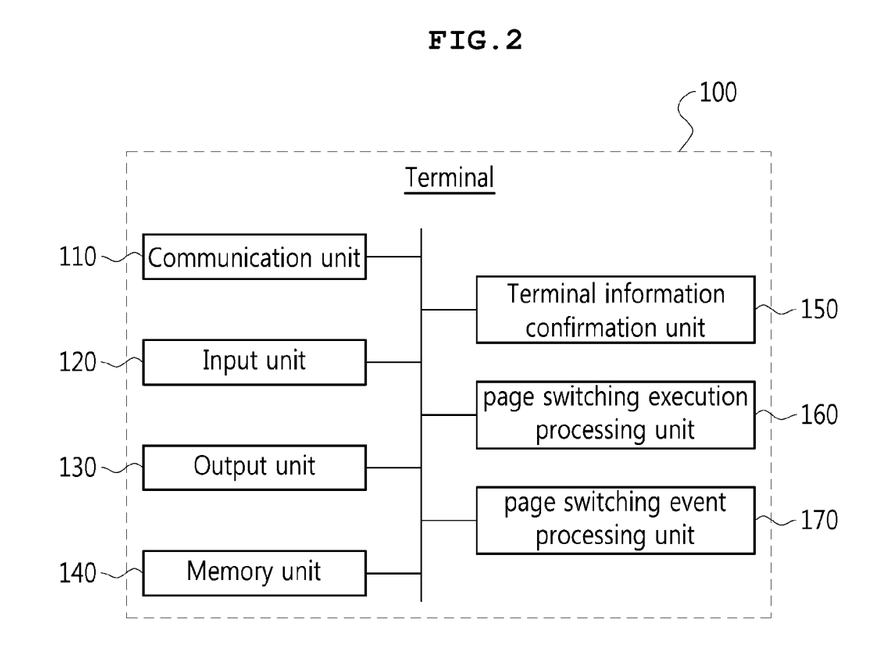
FIG. 2 is a block diagram schematically showing the construction of a terminal in accordance with an embodiment of the present invention.
Figure 3:
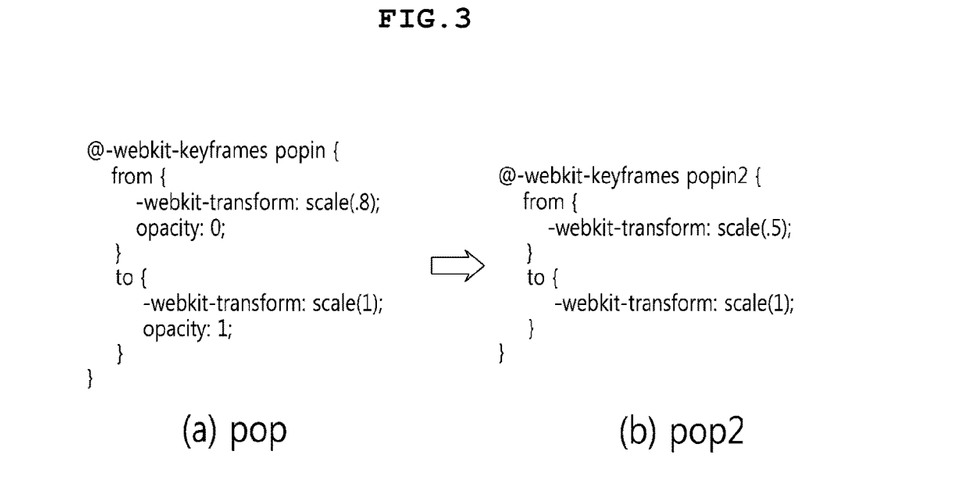
FIGS. 3 to 5 are diagrams showing an exemplary algorithm for generating a page switching effect as a substitution page switching effect in accordance with an embodiment of the present invention.
Figure 4:
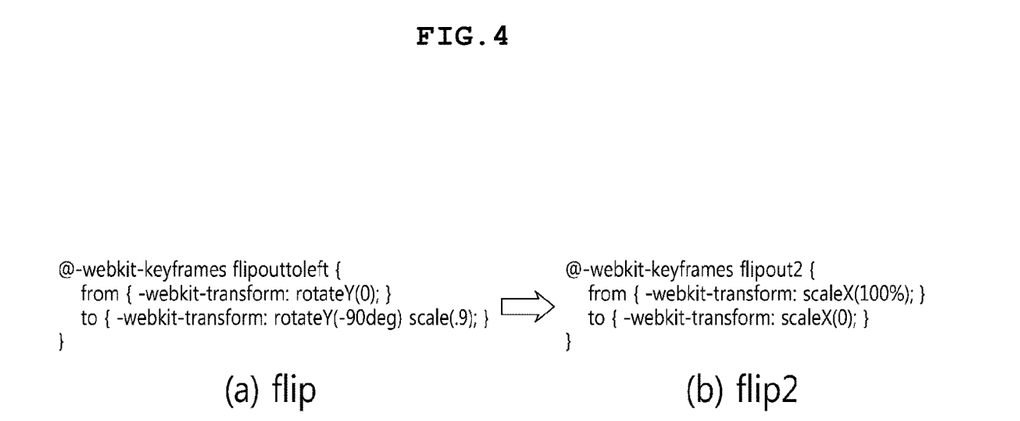
Figure 5:
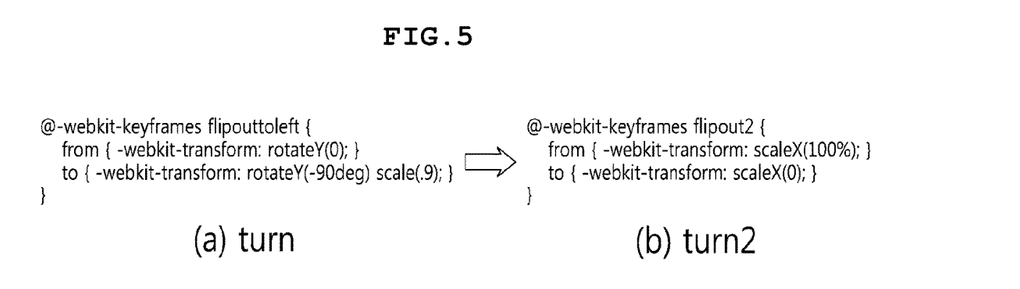

FIG. 2 is a block diagram schematically showing the construction of the terminal in accordance with an embodiment of the present invention, and FIGS. 3 to 5 are diagrams showing an exemplary algorithm for generating a page switching effect as a substitution page switching effect in accordance with an embodiment of the present invention.

Referring to FIG. 2, the terminal 100 includes a communication unit 110 for transmitting and receiving data over a communication network, an input unit 120, an output unit 130, a memory unit 140, a terminal information confirmation unit 150, a page switching execution processing unit 160, and a page switching event processing unit 170.

The communication unit 110 is communication means for connecting the terminal 100 and the service providing apparatus over a communication network, and it may include, for example, a wireless communication module, such as mobile communication or satellite communication, a wired communication module, such as the Internet, and a short-range wireless communication module, such as Wi-Fi.

The input unit 120 is means for receiving a user request for controlling the operation of the terminal 100, and it transforms a user request into an electrical signal in response to the user's manipulation. The input unit 120 refers to key input means for receiving the alphabet, numbers, and text information from a user, and the key input means may be implemented using a keyboard, a keypad, a touch screen or the like.

The output unit 130 displays a page for service that is provided to the terminal 100. Furthermore, the output unit 130 refers to display means for displaying screen information according to the driving of an application. Such an output unit 130 preferably is implemented using a small-sized flat panel display device, such as a Liquid Crystal Display (LCD) or Organic Light Emitting Diodes (OLED). The output unit 130 may be combined with the input unit 120 to form a touch screen form.

The memory unit 140 stores programs necessary to control the operation of the terminal 100 and data generated when the programs are executed.

The terminal information confirmation unit 150 confirms terminal information when a page switching event is detected in a page that is displayed on the output unit 130.

Here, when tagging or a drag of a preset and specific time or more is detected in a page being displayed, the terminal information confirmation unit 150 recognizes that the page switching event has been generated. Furthermore, the terminal information may include the capacities of the terminal including a supportable transform function, the type of terminal, and so on The page switching execution processing unit 160 determines a page switching effect based on terminal information confirmed by the terminal information confirmation unit 150 and performs page switching with the determined page switching effect.

The page switching execution processing unit 160 determines whether a page switching effect set in service that is being provided is possible or not based on confirmed terminal information and performs page switching with the page switching effect set in the service if the page switching effect set in the service that is being provided is possible. If the page switching effect set in the service that is being provided is not possible based on the confirmed terminal information, the page switching execution processing unit 160 performs page switching with a page switching effect according to a predetermined fallback rule. Here, if the page switching effect according to the fallback rule is not possible based on terminal information, the page switching execution processing unit 160 implements a substitution page switching effect using a transform function that is supported in the terminal and performs page switching with the implemented substitution page switching effect.

A method of performing, by the page switching execution processing unit 160, page switching with a page switching effect determined based on terminal information is described below in more detail.

The page switching effect includes flip, pop, slide, slidedown, slideup, fade, turn, flow, none, etc., and each of the page switching effects consists of a combination of transform functions.

For example, fade may consist of a function 'opacity', pop may consist of a combination of the function 'opacity' and a function 'scale', slide may consist of a function 'translateX', slidedown may consist of a function 'translateY', slideup may consist of the function 'translateY', flip may consist of a combination of a function 'rotateY' and the function 'scale', turn may consist of a combination of the function 'rotateY' and the function 'scale', and flow may consist of a combination of the function 'translateX' and the function 'scale'.

Furthermore, each terminal may have a different supportable transform function depending on terminal capacities. For example, the function 'opacity' may normally operate in all terminals, the function 'scale' may normally operate in all terminals, the function 'translateX' may abnormally operate in default browsers of first terminal type series, the function 'translateY' may normally operate in all terminals, and the function 'rotateY' may abnormally operate in terminals other than second terminal type series.

Terminal support situations for the respective transform functions may be arranged into terminal support situations for respective page switching effects.

For example, fade may normally operate in all terminals because it consists of the function 'opacity'. Pop may normally operate in all terminals because it consists of a combination of the function 'opacity' and the function 'scale'. Slide may abnormally operate in first terminal type series because it consists of the function 'translateX'. Slidedown may normally operate in all terminals because it consists of the function 'translateY'. Slideup may normally operate in all terminals because it consists of the function 'translateY'. Flip may abnormally operate in terminals other than some of second terminal type series because it consists of a combination of the function 'rotateY' and the function 'scale'. Turn may abnormally operate in terminals other than some of the second terminal type series because it consists of a combination of the function 'rotateY' and the function 'scale'. Flow may abnormally operate in the first terminal type series because it consists of a combination of the function 'translateX' and the function 'scale'.

If a page switching effect for service is simply driven in order to guarantee the page switching effect to a maximum extent in a situation in which the page switching effect supportable for the capacities of each terminal has been determined as described above, malfunction is inevitably generated. For this reason, the page switching execution processing unit 160 needs to be able to determine whether a page switching effect set in service is possible or not and to perform page switching with a page switching effect according to a fallback rule which can replace the page switching effect set in the service if the page switching effect set in the service is impossible. For example, in accordance with the fallback rule, if slide is impossible, fallback is performed using slidedown, slideup, or fade. If flip, turn, or flow is impossible, fallback is performed using pop. If pop is impossible, fallback is performed using fade. If fade is impossible, a page switching effect may be obviated.

However, situations other than the fallback rules described as described above may occur. In such a case, a substitution page switching effect needs to be implemented using a transform function supportable by a terminal.

For example, in the case of 'pop' consisting of a combination of the function 'opacity' and the function 'scale', the page switching execution processing unit 160 may implement a substitution page switching effect using pop2 including only the function 'scale'. That is, a pop effect may be used using the function 'opacity' and the function 'scale', but if a combination of the two functions does not normally operate, the pop2 effect using only the function 'scale' may be produced and instead used. There is actually almost no difference in a page switching effect even in such a change. In such a case, the page switching execution processing unit 160 may implement a pop algorithm, implemented as in FIG. 3(*a*), using a pop2 algorithm as shown in FIG. 3(*b*).

Furthermore, in the case of 'flip' consisting of a combination of the function 'rotateY' and the function 'scale', the page switching execution processing unit 160 may implement a substitution page switching effect using 'flip2' consisting of the function 'scaleX'. That is, the page switching execution processing unit 160 may implement a flip algorithm, implemented as in FIG. 4(*a*), using a flip2 algorithm as shown in FIG. 4(*b*).

Furthermore, in the case of 'turn' consisting of a combination of the function 'rotateY' and the function 'scale', the page switching execution processing unit 160 may implement a substitution page switching effect using 'turn2' consisting of the function 'scaleX'. That is, the page switching execution processing unit 160 may implement a turn algorithm, implemented as in FIG. 5(*a*), using a turn2 algorithm as shown in FIG. 5(*b*).

A substitution page switching effect is implemented using a transform function that can be supported in the terminal 100 as described above. Although page switching is performed with the implemented page switching effect, almost no difference in a page switching effect is felt.

When a page switching event is generated in a page being displayed on the output unit 130, the page switching event processing unit 170 sends an advertisement information request signal to the service providing apparatus through the communication unit 110.

Furthermore, after a web/WAP page is displayed on the output unit 130, the page switching event processing unit 170 receives information about the next page of the displayed web/WAP page from the service providing apparatus 200 in a background task form and generates image information necessary for a page switching effect based on the received information. Here, the page being displayed includes one or more pages, and each of the pages can switch. Accordingly, when at least one of tagging or a drag for a specific page and a lapse of a preset and specific time is detected in a page being displayed, the page switching event processing unit 170 recognizes that a page switching event has been generated and sends an advertisement information request signal, including page identification information, terminal identification information, user identification information, and so on, to the service providing apparatus.

Furthermore, when advertisement information is received from the service providing apparatus, the page switching event processing unit 170 displays the received advertisement information, while implementing a process of a movement from a corresponding page to a previous or next sequence page with a predetermined page switching effect, and displays a target page when an advertisement display stop event is detected. Here, when a predetermined advertisement display stop button is selected or a preset and specific time elapses after an advertisement is displayed, the page switching event processing unit 170 recognizes that an advertisement display stop event has been generated, stops the display of advertisement information, and displays a target page.

When a page switching event is generated in a page being displayed, the page switching event processing unit 170 displays advertisement information on a rear region that is generated and seen when the corresponding page is turned over, while implementing a page switching effect (flip) in which the corresponding page is turned over on the basis of the center of an x axis, and displays a target page when an advertisement display stop event is recognized.

Furthermore, when a page switching event is generated, the page switching event processing unit 170 displays advertisement information on a new window, while implementing a page switching effect (pop) in which the new window pops up in a region of the corresponding page, and displays a target page on the corresponding page region when an advertisement display stop event is recognized.

Furthermore, when a page switching event is generated, the page switching event processing unit 170 displays advertisement information in the middle of a new page, while implementing a page switching effect (slide) in which a corresponding page is generally scrolled, the new page is also scrolled, and thus a previous page slides out, and displays a target page when an advertisement display stop event is recognized.

Furthermore, when a page switching event is generated, the page switching event processing unit 170 fades in a page on which advertisement information is displayed instead of a new page, while implementing a page switching effect (fade) in which a previous page fades out and the new page fades in and fades a target page in when an advertisement display stop event is recognized.

Furthermore, when a page switching event is generated, the page switching event processing unit 170 displays advertisement information on a rear region of a corresponding page that is generated and seen when the corresponding page is turned over to a target page, while implementing a page switching effect (turn) in which the leaves of a book are turned over, and displays the target page when an advertisement display stop event is recognized.

Furthermore, when a page switching event is generated, the page switching event processing unit 170 displays a page into which advertisement information has been inserted instead of a new page, while implementing a page switching effect (flow) in which the scale of a previous page is reduced by about 50%, the previous page slides out, the new page slides in on a screen in the state in which the new page has been reduced to 50%, and the screen returns back to a normal scale, and displays a target page when an advertisement display stop event is recognized.

Furthermore, when a page switching event is generated, the page switching event processing unit 170 may display an advertisement page without a subpage switching effect.

Figure 6:
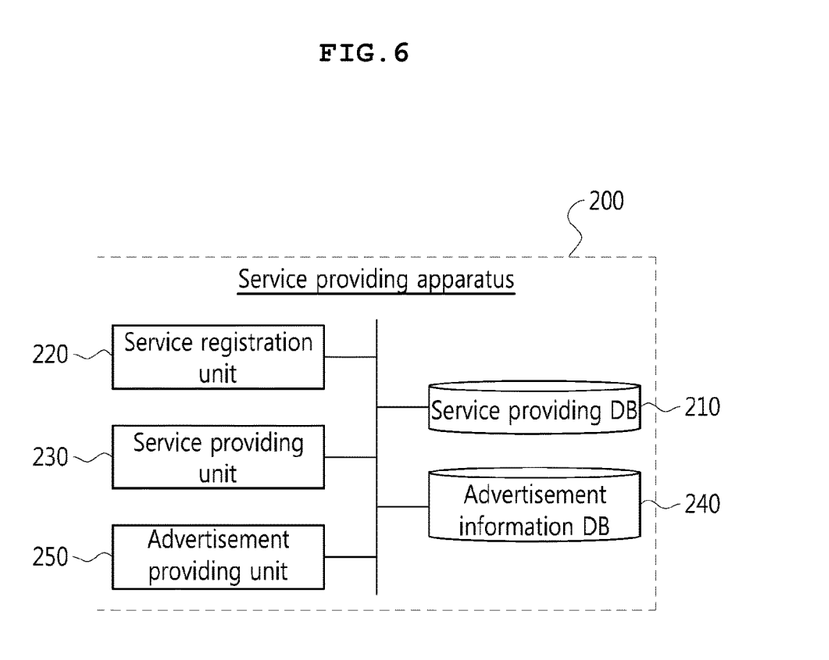
FIG. 6 is a block diagram schematically showing the construction of a service providing apparatus in accordance with an embodiment of the present invention.

FIG. 6 is a block diagram schematically showing the construction of the service providing apparatus in accordance with an embodiment of the present invention.

Referring to FIG. 6, the service providing apparatus 200 includes a service providing database (DB) 210, a service registration unit 220, a service providing unit 230, an advertisement information DB 240, and an advertisement providing unit 250.

The service providing DB 210 stores pieces of information about web or WAP service, a page for web or WAP service, and service-related information including at least one of a page switching effect for each service and a fallback rule. Furthermore, a page switching effect and a fallback rule for the page switching effect have been set in service stored in the service providing DB 210, each page switching effect includes a transform function, and information about a supportable terminal is set in each transform function.

When a service registration request signal including at least one of service, a page switching effect set in the service, and a fallback rule for the page switching effect is received, the service registration unit 220 stores information about the service in the service providing DB 210.

When the providing of service is requested by the terminal, the service providing unit 230 obtains the corresponding service from the service providing DB 210 and provides the obtained service. That is, the service providing unit 230 obtains a web or WAP page for corresponding service from the service providing DB 210 in response to a request from the user terminal and provides the obtained web or WAP page to the user terminal. Here, the web page or WAP page includes one or more pages, and each of the pages can switch. Here, a page switching effect is set in each service.

The advertisement information DB 240 stores pieces of advertisement information. Here, the advertisement information DB 240 stores advertisement information corresponding to page identification information, advertisement information according to a predetermined advertisement scheduling algorithm and advertisement information according to preference.

When an advertisement information request signal is received from the user terminal, the advertisement providing unit 250 obtains advertisement information from the advertisement information DB 240, transforms the obtained advertisement information according to the standards of a user terminal, and provides the transformed advertisement information to the user terminal. Here, the advertisement information request signal includes user identification information, page identification information, terminal identification information, and so on. Accordingly, the advertisement providing unit 250 obtains advertisement information through at least one of methods using advertisement information corresponding to page identification information, advertisement information according to a predetermined advertisement scheduling algorithm, and advertisement information based on preference advertisement information corresponding to user identification information. Thereafter, the advertisement providing unit 250 transforms the obtained advertisement information according to the standards of a user terminal and the size of a page and provides the transformed advertisement information to the user terminal.

Figure 7:
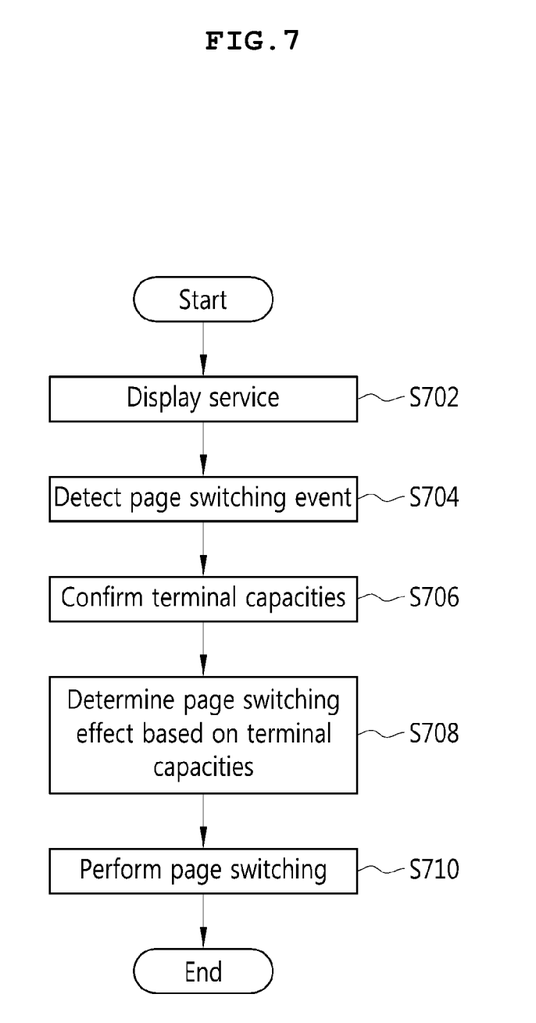
FIG. 7 is a flowchart illustrating a method for controlling a page switching capacity in accordance with an embodiment of the present invention.

FIG. 7 is a flowchart illustrating a method for controlling a page switching capacity in accordance with an embodiment of the present invention.

Referring to FIG. 7, when a page switching event is detected (S704) while displaying a page for service (S702), the terminal confirms terminal information (S706). Here, the terminal information may include the type, capacities, etc. of the terminal, and the capacities may include a supportable transform function, etc.

When step S706 is performed, the terminal determines a page switching effect based on the confirmed terminal information (S708) and performs page switching with the determined page switching effect (S710).

A method of determining, by the terminal, a page switching effect based on terminal information is described in detail with reference to FIG. 8.

Figure 8:
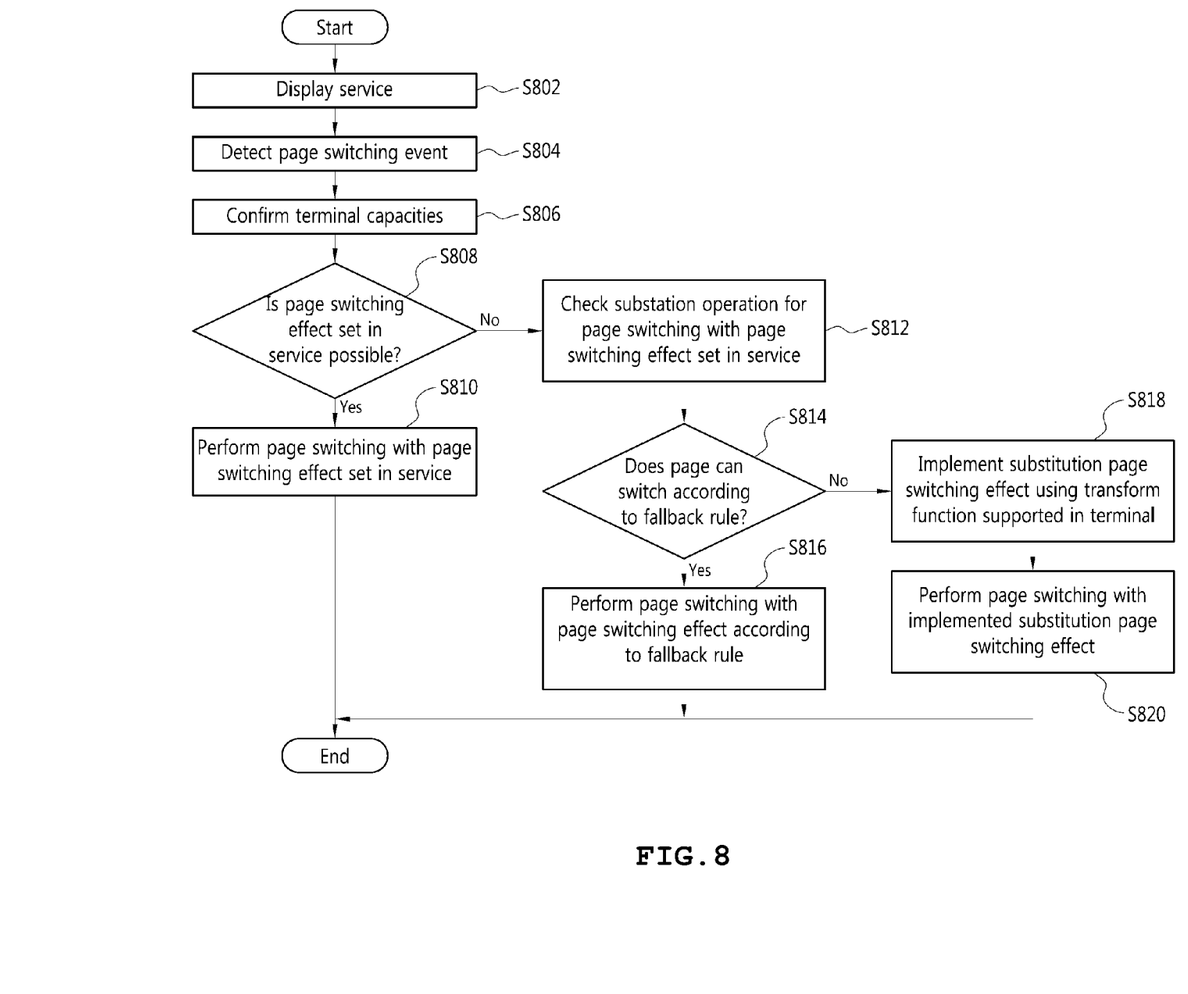
FIG. 8 is a detailed flowchart illustrating the method for controlling a page switching capacity in accordance with an embodiment of the present invention.

FIG. 8 is a detailed flowchart illustrating the method for controlling a page switching capacity in accordance with an embodiment of the present invention.

Referring to FIG. 8, when a page switching event is detected (S804) while displaying a page for service (S802), the terminal confirms terminal information (S806). Here, the terminal information may include the type, capacities, etc. of the terminal, and the capacities may include a supportable transform function, etc.

After step S806 is performed, the terminal determines whether a page switching effect set in the service is possible or not based on the confirmed terminal information (S808). That is, since information about a terminal capable of executing a page switching effect is also set in the page switching effect, the terminal determines whether or not the confirmed terminal information complies with terminal information corresponding to the page switching effect set in the service. If, as a result of the determination, the confirmed terminal information complies with the terminal information set in the service, the terminal determines that the page switching effect set in the service is possible. If, as a result of the determination, the confirmed terminal information does not comply with the terminal information set in the service, the terminal determines that the page switching effect set in the service is not possible.

If, as a result of the determination at step S808, the page switching effect set in the service is possible, the terminal performs page switching with the page switching effect set in the service (S810).

If, as a result of the determination at step S808, the page switching effect set in the service is not possible, the terminal confirms a predetermined fallback rule (S812) and determines whether or not a page switching effect according to a fallback rule is possible based on the confirmed terminal information (S814). That is, a page switching effect and a fallback rule for the page switching effect are set in each service, each page switching effect includes a transform function, and information about a supportable terminal is set in each transform function. Accordingly, the terminal determines whether or not the transform function of a page switching effect according to a fallback rule is a transform function supportable by the terminal. If, as a result of the determination, the transform function of the page switching effect according to the fallback rule is a transform function supportable by the terminal, the terminal may determine that the page switching effect according to the fallback rule is possible.

If, as a result of the determination at step S814, the page switching effect according to the fallback rule is possible, the terminal performs page switching with the page switching effect according to the fallback rule (S816).

If, as a result of the determination at step S814, the page switching effect according to the fallback rule is not possible, the terminal implements a substitution page switching effect using a transform function that is supported in the terminal (S818) and performs page switching with the implemented substitution page switching effect (S820).

Figure 9:
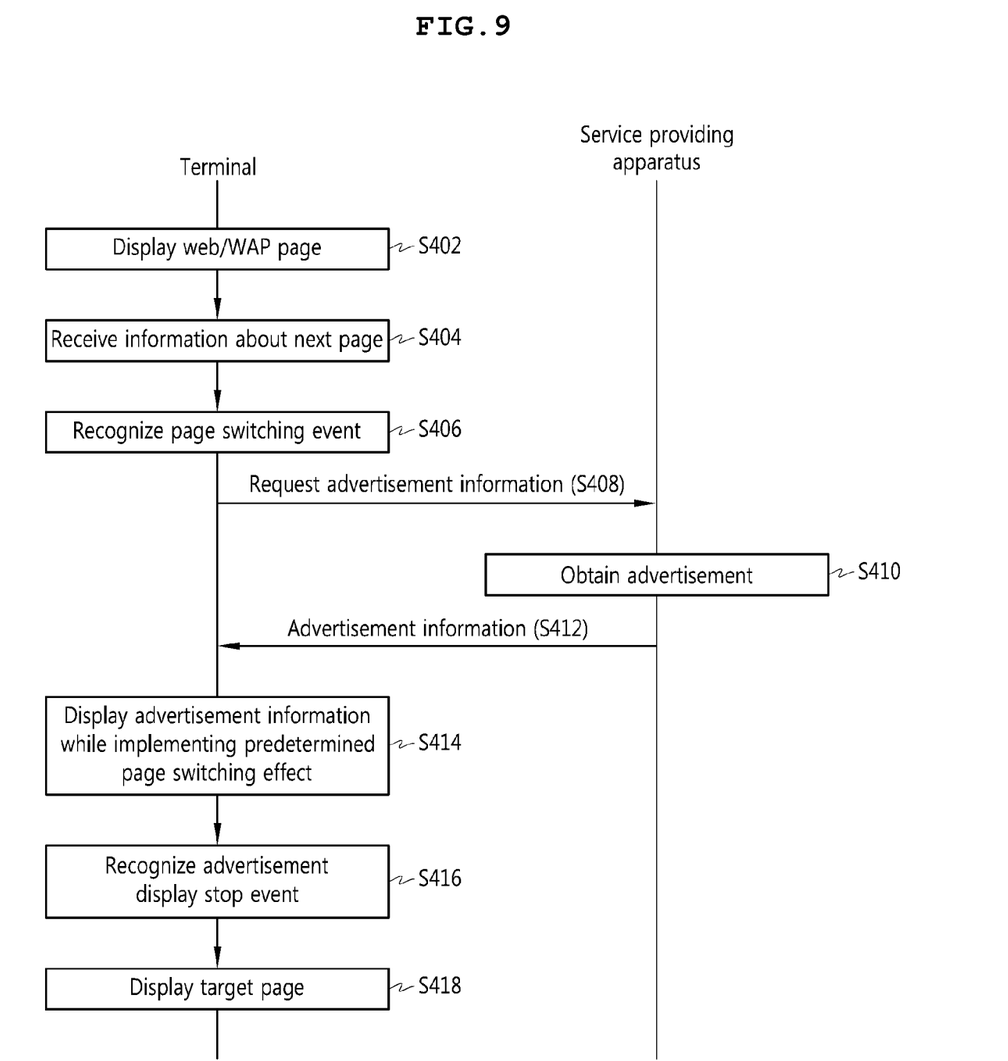
FIG. 9 is a flowchart illustrating a method for providing advertisement service when a page switches in accordance with an embodiment of the present invention.

FIG. 9 is a flowchart illustrating a method for providing advertisement service when a page switches in accordance with an embodiment of the present invention.

Referring to FIG. 9, while displaying a web/WAP page (S402), the user terminal receives information about the next page of the displayed web/WAP page from the service providing apparatus in a background task form and generates image information necessary for a screen switching effect (S404). That is, after a web/WAP page is displayed, the user terminal receives information about the next page of the displayed web/WAP page from the service providing apparatus in a background task form over a communication network and generates image information necessary for a screen switching effect based on the received information.

After step S404 is performed, when a page switching event is detected (S406), the user terminal sends an advertisement information request signal to the service providing apparatus (S408). That is, when a user tags or drags a specific page in a current page or a preset and specific time elapses, the user terminal recognizes that the page switching event has been generated and sends the advertisement information request signal, including page identification information, terminal identification information, user identification information, and so on, to the service providing apparatus.

When step S408 is performed, the service providing apparatus obtains advertisement information (S410) and sends the advertisement information to the user terminal (S412). Here, the service providing apparatus obtains advertisement information through at least one of methods using advertisement information corresponding to page identification information, advertisement information according to a predetermined advertisement scheduling algorithm, and advertisement information based on preference advertisement information corresponding to user identification information and sends the advertisement information to the user terminal. The service providing apparatus may transform the obtained advertisement information according to the standards of the user terminal and the scale of a page and provide the transformed advertisement information to the user terminal.

When step S412 is performed, the user terminal displays the received advertisement information while implementing a process of movement from the page to a previous or next sequence page with a predetermined page switching effect (S414). Here, the user terminal displays the advertisement information on a page region while implementing at least one page switching effect of 'flip', 'pop', 'slide', 'fade', 'turn', 'flow', and 'none'.

After step S414 is performed, when an advertisement display stop event is recognized (S416), the user terminal stops the display of the advertisement information and displays a target page on a region of the corresponding page (S418). That is, when a user selects a predetermined advertisement display stop button and a preset and specific time elapses after an advertisement is displayed, the user terminal recognizes that the advertisement display stop event has been generated, stops the displays of the advertisement information, and displays a target page.

Meanwhile, in accordance with another aspect of the present invention, there is provided an electronic device-readable recording medium on which a method for controlling a page switching capacity, including steps of (a) when a page switching event is detected in a currently displayed page, confirming terminal information and (b) determining a page switching effect based on the confirmed terminal information and performing page switching with the determined page switching effect, has been recorded in a program form.

Such a method for controlling a page switching capacity can be written in a program form, and pieces of code and code segments that form the program can be easily induced by a programmer skilled in the art. Furthermore, a program regarding the method for generating a 3D object can be stored in a medium readable by an electronic device and can be read and executed by an electronic device.

As described above, those skilled in the art to which the present invention pertains will understand that the present invention may be implemented in other various forms without departing from the technical spirit or essential characteristics of the present invention. Accordingly, the aforementioned embodiments should not be construed as being limitative, but should be construed as being only illustrative from all aspects. The scope of the present invention is clearly disclosed in the appended claims rather than the detailed description. It should be understood that all modifications or variations derived from the meanings and scope of the present invention and equivalents thereof are included in the scope of the appended claims.

INDUSTRIAL APPLICABILITY

The present invention can be applied to a method and apparatus for controlling a page switching capacity, wherein when a page switching event is generated, a page switching effect can be determined based on terminal information including the type or capacities of the terminal, page switching can be performed with the determined page switching effect, and the most similar page switching effect can be provided in relation to page switching effects not supportable by a terminal.

The invention claimed is:

1. A terminal, comprising:
   an input unit configured to receive a user command;
   an output unit configured to display a page for service;
   a terminal information confirmation unit configured to, when a page switching event is detected in the page displayed on the output unit, check terminal information of the terminal; and
   a page switching execution processing unit configured to determine a page switching effect based on the checked terminal information and perform page switching with the determined page switching effect,
   wherein the page switching execution processing unit is configured to
      determine whether or not a page switching effect set in the service is possible based on the checked terminal information,
      when the page switching effect set in the service is possible, perform page switching with the page switching effect set in the service, and
      when the page switching effect set in the service is not possible, perform page switching with a page switching effect according to a predetermined fallback rule, and
   wherein, when the page switching effect according to the predetermined fallback rule is not possible based on the terminal information, the page switching execution processing unit is configured to
      implement a substitution page switching effect using the transform function supportable by the terminal and
      perform page switching with the implemented substitution page switching effect.

2. The terminal of claim 1, further comprising a page switching event processing unit configured to,
   when the page switching event is generated in the page being displayed on the output unit, send an advertisement information request signal to a service providing apparatus,
   when the advertisement information is received from the service providing apparatus, display the received advertisement information while implementing a process of a movement from the displayed page to a previous or next target page with the determined page switching effect, and
   when an advertisement display stop event is detected, display the target page.

3. The terminal of claim 1, wherein the terminal information comprises capacities of a terminal comprising a supportable transform function and a type of terminal.

4. The terminal of claim 1, wherein the page switching effect is at least one of
   a page switching effect (flip) in which the displayed page is turned over based on a center of an x axis,
   a page switching effect (pop) in which a new window pops up,
   a page switching effect (slide) in which the displayed page and new page are scrolled so that the displayed page slides out,
   a page switching effect (fade) in which the displayed page fades out and a new page fades in,
   a page switching effect (turn) in which leaves of a book are turned over,
   a page switching effect (flow) in which a scale of the displayed page is reduced to a specific scale, the reduced page slides out, a new page slides in on a screen in a state in which the new page has been reduced to a specific scale, and the new page returns to a normal scale again,
   slidedown, and
   slideup.

5. The terminal of claim 2, wherein when the page switching event is generated in the displayed page, the page switching event processing unit is configured to
   perform one of
      displaying the advertisement information on a rear region of the displayed page which is generated and seen when the displayed page is turned over while implementing a page switching effect (flip) in which the displayed page is turned over based on a center of an x axis, displaying the advertisement information on a new window while implementing a page switching effect (pop) in which the new window pops up in a region of the displayed page, displaying the advertisement information in a middle of a new page while implementing a page switching effect (slide) in which the displayed page and new page are scrolled so that the displayed page slides out, fading in a page on which advertisement information is displayed instead of a new page while implementing a page switching effect (fade) in which the displayed page fades out and the new page fades in, displaying the advertisement information on a rear region of the displayed page that is generated and seen when the displayed page is turned over to the target page while implementing a page switching effect (turn) in which leaves of a book are turned over, or displaying a page into which advertisement information has been inserted instead of a new page while implementing a page switching effect (flow) in which a scale of a previous page is reduced by a specific scale, the displayed page slides out, the new pages slides in on a screen in a state in which the new page has been reduced to a specific scale, and the screen returns back to a normal scale, and when an advertisement display stop event is recognized, display a target page.

6. A service providing apparatus, comprising:
a service providing database (DB) configured to store service-related information comprising at least one of a page switching effect and a fallback rule for each service;
a service registration unit configured to, when a service registration request signal comprising at least one of service, the page switching effect set in the service, and the fallback rule for the page switching effect is received from a terminal, store information about the service in the service providing DB; and
a service providing unit configured to, when providing of the service is requested by the terminal, obtain a web or WAP page for the requested service from the service providing DB and provide the obtained web or WAP page to the terminal,
wherein the terminal is configured to
determine whether the page switching effect set in the requested service is possible or not based on terminal information of the terminal, said terminal information comprising a transform function supportable by the terminal and a type of the terminal,
when the page switching effect set in the service is possible, perform page switching with the page switching effect set in the requested service, and
when the page switching effect set in the service is not possible, perform page switching with the page switching effect according to a predetermined fallback rule, and
wherein when the page switching effect according to the predetermined fallback rule is not possible based on the terminal information, the terminal is configured to
implement a substitution page switching effect using the transform function supportable by the terminal and
perform page switching with the implemented substitution page switching effect.

7. The service providing apparatus of claim 6, further comprising:
an advertisement information DB configured to store advertisement information; and
an advertisement providing unit configured to
when an advertisement information request signal is received from the terminal, obtain advertisement information from the advertisement information DB
transform the obtained advertisement information according to standards of the terminal or a scale of a page, and
provide the transformed advertisement information to the terminal.

8. The service providing apparatus of claim 6, wherein a page switching effect and a fallback rule for the page switching effect are set in the each service stored in the service providing DB,
the page switching effect comprises a transform function, and
information about a supportable terminal is set in the transform function.

9. The service providing apparatus of claim 7, wherein the advertisement providing unit is configured to obtain the advertisement information through at least one of methods using
advertisement information corresponding to corresponding page identification information,
advertisement information according to a predetermined advertisement scheduling algorithm, and
advertisement information based on preference advertisement information corresponding to user identification information.

10. A system for controlling a page switching capacity, the system comprising:
a terminal configured to send a request of service; and
a service providing apparatus configured to, when the request of service is received from the terminal,
provide the terminal with information related to a page switching effect set in the requested service along with the requested service,
wherein the terminal is configured to, when a page switching event is detected in a page displayed on the terminal,
check terminal information of the terminal, the terminal information comprising a transform function supportable by the terminal and a type of the terminal,
determine a page switching effect based on the checked terminal information, and
perform page switching with the determined page switching effect,
wherein the terminal is configured to
determine whether the page switching effect set in the requested service is possible or not based on the terminal information,
when the page switching effect set in the service is possible, perform page switching with the page switching effect set in the requested service, and
when the page switching effect set in the service is not possible, perform page switching with a page switching effect according to a predetermined fallback rule, and
wherein when the page switching effect according to the predetermined fallback rule is not possible based on the terminal information, the terminal is configured to
implement a substitution page switching effect using the transform function supportable by the terminal and perform page switching with the implemented substitution page switching effect.

11. The system of claim 10, wherein the terminal is configured to, when the page switching event is generated in the page displayed on the terminal, send an advertisement information request signal to the service providing apparatus, wherein the service providing apparatus is configured to, when the advertisement information request is received from the terminal, obtain the advertisement information from an advertisement information DB, transform the obtained advertisement information according to standards of the terminal or a scale of a page, and provide the transformed advertisement information to the terminal, wherein the terminal is configured to, when the advertisement information is received from the service providing apparatus, display the received advertisement information while implementing a process of a movement from the displayed page to a previous or next target page with the determined page switching effect, and when an advertisement display stop event is detected, display the target page.

12. A method of controlling, by a user terminal, a page switching capacity, the method comprising steps of:

checking terminal information of the terminal, the terminal information comprising a transform function supportable by the terminal and a type of the terminal, when a page switching event is detected in a page displayed on an output unit of the terminal; and determining a page switching effect based on the checked terminal information and performing page switching with the determined page switching effect, wherein the step of determining comprises steps of determining whether or not a page switching effect set in a service corresponding to the displayed page is possible based on the checked terminal information, when the page switching effect set in the service is possible, performing page switching with the page switching effect set in the service, and when the page switching effect set in the service is not possible, performing page switching with a page switching effect according to a predetermined fallback rule, and wherein the step of performing page switching with the page switching effect according to the predetermined fallback rule comprises steps of, determining whether or not the page switching effect according to the fallback rule is possible based on the checked terminal information, and when the page switching effect according to the fallback rule is possible, performing page switching with the page switching effect according to the fallback rule, and when the page switching effect according to the fallback rule is not possible, implementing a substitution page switching effect using the transform function supportable by the terminal, and performing page switching with the implemented substitution page switching effect.

13. The method of claim 12 further comprising steps of:

sending an advertisement information request signal to a service providing apparatus when the page switching event is generated in the page displayed on the terminal;

when advertisement information is received from the service providing apparatus, displaying the received advertisement information while implementing a process of a movement from the displayed page to a previous or next sequence page with the determined page switching; and when an advertisement display stop event is detected, displaying the target page.

* * * * *